United States Patent
Scarr

(10) Patent No.: US 6,302,383 B1
(45) Date of Patent: Oct. 16, 2001

(54) TAMPER RESISTANT DEVICE FOR ENGINE ADJUSTER

(75) Inventor: Kimball Rustin Scarr, Santa Ana, CA (US)

(73) Assignee: Impco Technologies, Inc., Cerritos, CA (US)

( * ) Notice: Subject to any disclaimer, the term of this patent is extended or adjusted under 35 U.S.C. 154(b) by 0 days.

(21) Appl. No.: 09/567,444

(22) Filed: May 8, 2000

(51) Int. Cl.$^7$ .................................................. F02M 3/08
(52) U.S. Cl. .................... 261/71; 137/382; 261/DIG. 38; 261/DIG. 84
(58) Field of Search ............... 261/71, DIG. 38, 261/DIG. 84; 137/382, 382.5

(56) References Cited

U.S. PATENT DOCUMENTS

| | | | |
|---|---|---|---|
| 2,590,217 | * 3/1952 | Snyder et al. | 261/71 X |
| 3,618,906 | * 11/1971 | Charron | 137/382.5 X |
| 4,097,561 | * 6/1978 | Seki et al. | 261/DIG. 38 |
| 4,234,523 | * 11/1980 | Onuki et al. | 137/382 X |
| 4,234,524 | * 11/1980 | Arai | 137/382.5 X |
| 4,239,710 | * 12/1980 | Sato | 261/DIG. 38 |
| 4,242,290 | * 12/1980 | Handelsman et al. | 261/71 X |
| 4,246,929 | * 1/1981 | Wakeman | 137/382 |
| 4,271,095 | 6/1981 | Maeda | 261/71 X |
| 4,272,458 | 6/1981 | Ruth et al. | 137/382 X |
| 4,273,730 | * 6/1981 | Byrnes, Jr. | 261/71 X |
| 4,283,353 | * 8/1981 | Miller | 261/DIG. 38 |
| 4,308,220 | * 12/1981 | Tateno | 137/382 X |
| 4,317,784 | * 3/1982 | Kato et al. | 261/DIG. 84 |
| 4,336,208 | * 6/1982 | Gerhardy | 261/71 |
| 4,378,321 | * 3/1983 | Miller | 261/DIG. 84 |
| 4,470,769 | * 9/1984 | Owens | 137/382 X |
| 4,718,828 | 1/1988 | Breeck et al. | 261/DIG. 84 |
| 4,759,883 | * 7/1988 | Woody et al. | 261/DIG. 84 |
| 5,308,220 | 5/1994 | Schaeff | 414/699 |
| 5,635,113 | * 6/1997 | Walsh et al. | 261/71 |
| 5,707,561 | * 1/1998 | Swanson | 261/DIG. 38 |
| 5,753,148 | 5/1998 | King et al. | 261/71 |
| 6,123,322 | * 9/2000 | Sasaki | 261/DIG. 84 |

FOREIGN PATENT DOCUMENTS 55-104556 * 8/1980 (JP) ............................... 261/DIG. 84

* cited by examiner

Primary Examiner—Richard L. Chiesa
(74) Attorney, Agent, or Firm—Edward A. Sokolski

(57) ABSTRACT

A cover is installed over an engine adjuster such as a carburetor adjustment screw. This cover is in the form of a cap having a flat top with a frangible brim portion. The cap is installed in a housing for the adjustment device, in a recess directly above the adjustment device. An inner rim is formed on the cap beneath the flat top with a recessed portion being formed between the top and the rim. The inner rim of the cap matingly engages a rim which may be formed in the top portion of the adjuster or in a housing surrounding the adjuster and snaps into place joined to either the adjuster or its housing. An anti-pry protective washer or shoulder is provided in the housing. This anti pry device is positioned in close proximity to the outer wall of the inner rim of the cap in a manner to prevent prying instruments from reaching under the inner rim in an attempt to remove the cap. When attempts are made to reach under the cap, the frangible brim portion is likely to break providing evidence of attempted tampering.

7 Claims, 2 Drawing Sheets

TAMPER RESISTANT DEVICE FOR ENGINE ADJUSTER

BACKGROUND OF THE INVENTION

1. Field of the Invention

This invention relates to gaseous and liquid fuel engines and more particularly to a device for curtailing tampering with the fuel adjustments of such engines.

2. Description of the Related Art

Once the carburetor adjustments or other adjustment screws of an engine using gasoline or natural gas have been properly set for optimum performance commensurate with minimum pollutant emission, it is highly undesirable if these settings are tampered with. Such changing of the settings could both increase the pollutant emissions to an unacceptable level and decrease the efficiency of the operation of the engine.

In an effort to prevent such tampering, various devices have been developed in the prior art. Such devices include a shield which is press fitted in position a housing retaining the adjustment screw as described in U.S. Pat. No. 4,718,828 issued Jan. 12, 1988 to Breeck,et al; a cover for the adjustment screw which is not removable once installed and which includes a slot through which access to the adjustment screw can be obtained only with a special tool as described in U.S. Pat. No. 4,271,095 issued Jun. 2, 1981 to Maeda; a wall in the shape of a hollow tube in which the adjustment member is installed having a plug at one end which can only be removed with a special tool such as described in U.S. Pat. No. 4,308,220 issued Dec. 29, 1981 to Tateno. Other such devices are described in U.S. Pat. No. 4,246,929 issued Jan. 27, 1981 to Wakeman; U.S. Pat. No. 4,272,458 issued Jun. 9, 1981 to Ruth, etal.; U.S. Pat. No. 4,470,769 issued Sep. 11, 1984 to Owens; and U.S. Pat. No. 5,753,148 issued May 19, 1998 to King et al.

The device of the present invention is believed to provide an advantage over these prior art devices by virtue of its simple and economical construction and its capability of providing immediate evidence of actual or attempted tampering with the adjustment.

SUMMARY OF THE INVENTION

The device of the present invention employs a cap having a "sombrero" shape with a flat top and an indented rim directly beneath the top. The body of the cap has an indented conical shape extending from the rim. Accordingly, a tapered recessed portion is formed in the inner surface of the cap between the top and the rim. The cap fits into a mating aperture formed in the housing for an engine adjustment device, such as, for example the adjustment screw of a carburetor. The cap is positioned directly above the adjustment device with its tapered recessed portion engaging and snapping into a mating rim formed in the top portion of the adjustment device or its housing. While retained in position over the adjustment device, the cap is free to rotate so that it cannot be freed by the use of rotational force.

An anti-pry device formed by a washer installed in the adjuster housing or a shoulder formed in the housing is positioned in close proximity to the outer wall of the inner rim of the cap in a manner such as to prevent prying instruments from reaching under the inner rim in an attempt to remove the cap. The top cap has an a frangible brim portion which is likely to break should one attempt to reach under the cap with a prying instrument such as a screw driver, thus providing evidence of attempted tampering.

It is therefore an object of this invention to provide a simple and economical device for resisting tampering with an engine adjuster.

It is a further object of this invention to provide an improved anti-tamper device for installation over an engine adjuster which provides clear evidence that tampering has occurred.

Other objects of the invention will become apparent from the following description taken in connection with the accompanying drawings.

DETAILED DESCRIPTION OF THE INVENTION

Figures 1, 1A:
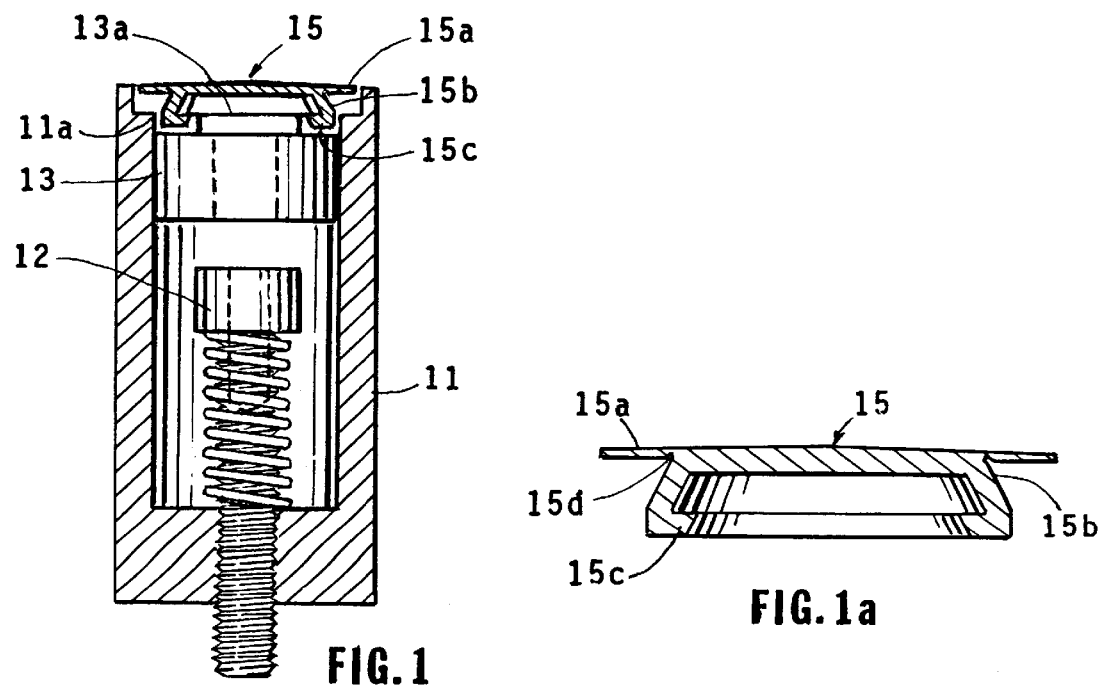
FIG. 1 is an elevational view in cross section of a first embodiment of the invention.
FIG. 1a is an elevational view in cross section of the cap member of the preferred embodiment.
Figure 2:
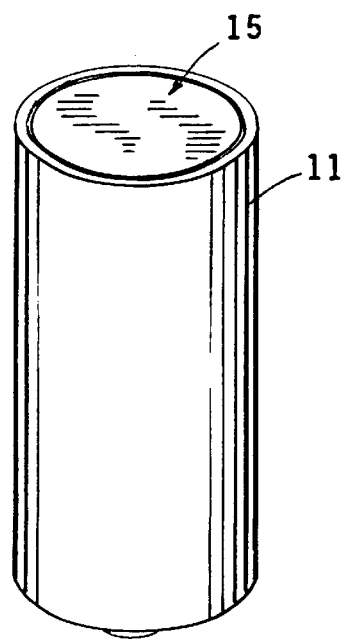
FIG. 2 is a top perspective view of the embodiment of FIG. 1.

Referring now to FIGS. 1, 1a, 2 and 5, a first embodiment of the invention is shown.

Mounted within housing 11 is an adjustment screw 12 for adjusting an engine such as, for example, a carburetor adjustment screw. Cylindrical insert member 13, is fixedly attached to the inner wall of housing 11. Insert member 13 has a rim portion 13a which extends outwardly. Cap 15 is in the form of a "sombrero" and has a flat top portion with a frangible brim 15a. The outer body 15b of the cap is substantially a frustrum of a cone joining the frangible brim 15a at the smaller diameter of the conic section. Extending outwardly from the inner wall of the top portion is a recessed inner rim 15c which engages a mating rim 13a formed in insert member 13. The cap thus snaps into engagement with the housing insert but is free to rotate.

A shoulder 11a is formed along the inner wall of housing 11 directly opposite and in close proximity to rim 15b. This tends to prevent the insertion of prying device such as a screw driver under the bottom of the cap. Efforts to remove the cap will generally involve prying on the rim tending to break this rim, thus providing evidence of tampering.

As shown in FIG. 1A, a fracture groove 15d may be incorporated on the underside of the cap to increase the frangibility of the rim.

Figure 3:
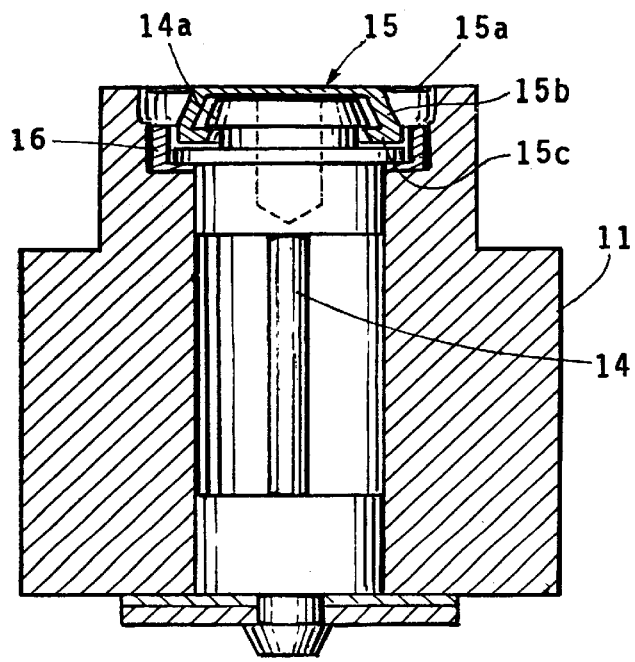
FIG. 3 is an elevational view in cross section of a second embodiment of the invention.
Figure 5:
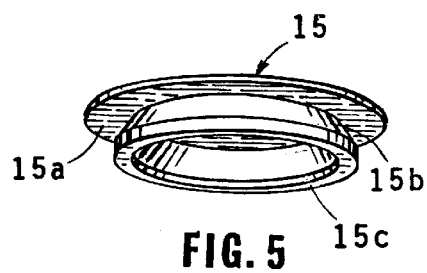
FIG. 5 is a bottom perspective view of the cap member utilized in the device of the invention.
Figure 4:
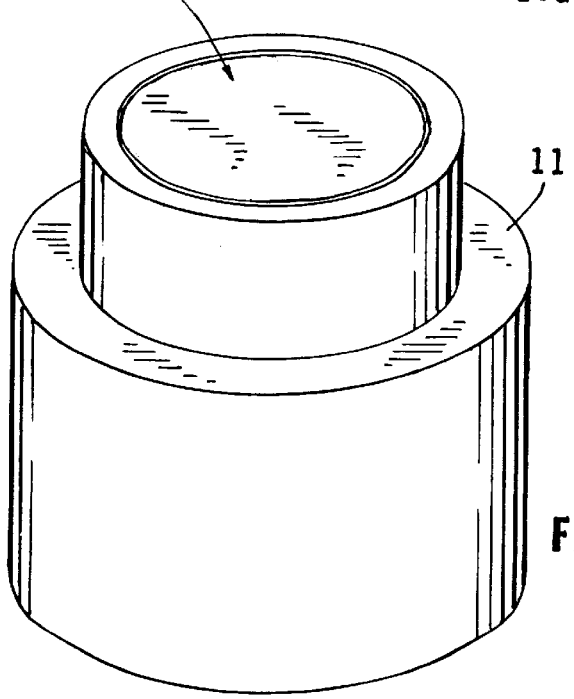
FIG. 4 is top perspective view of the second embodiment.

Referring now to FIGS. 3 and 4, a second embodiment of the invention is illustrated.

Rotating valve adjuster 14 has a rim portion 14a formed on its top which engages the rim portion 15c of cap 15. Cap 15 is of the same construction as that of the first embodiment, having a frangible rim. A washer 16 is installed between housing 11 and rim 15b of the cap to prevent prying of the cap.

Figure 6:
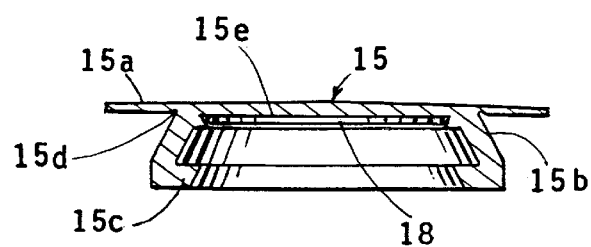
FIG. 6 is a cross sectional view of the second embodiment of the cap member utilized in the device of the invention.

Referring now to FIG. 6 a second embodiment of the cap is illustrated. This embodiment provides increased puncture resistance to the central portion of the cap. Hard metal disk shield 18 is removably installed within a recess 15e formed in cap 15, thereby strengthening the cap against penetration by sharp objects. Beyond providing increased penetration resistance, the shield protects the adjustment device against tampering with an adjustment device if the cap brim has been previously penetrated.

Thus, the device of the invention makes it difficult to remove the cap to adjust the adjustment screw and where such efforts have been made provides evidence thereof so that if need be the screw can be re-adjusted.

While the invention has been described and illustrated in detail it is to be understand that this is intended by way of illustration and example only, the scope of the invention being limited by the terms of the following claims.

I claim:

1. A tamper resistant device for deterring access to an engine adjuster and providing evidence of such tampering comprising:

a housing in which said engine adjuster is mounted, said housing having an aperture formed therein directly opposite said engine adjuster, a cover in the form of a cap installed in said aperture, said cap having a top portion with a frangible brim, an inner rim formed beneath the top portion, and a recessed portion formed between said top portion and said inner rim, a housing rim fixedly attached to said housing which matingly engages the inner rim of said cap when said cap is installed in said aperture thereby retaining said cap on said housing, said cap deterring access to said engine adjuster, said cap brim readily breaking off when pried thereby providing evidence of such prying.

2. The device of claim 1 and further including anti-pry means installed in said housing to deter the access of a prying tool to the bottom of said cap.

3. The device of claim 1 wherein said housing rim is formed in the top portion of said engine adjuster.

4. The device of claim 1 wherein said housing rim comprises a washer along the inner wall of said housing.

5. The device of claim 1 wherein said cap is rotatably supported on said housing.

6. The device of claim 1 and additionally including a hard metal shield installed in the inner wall of said cap.

7. The device of claim 1 wherein said cap has a groove running therearound at the inner end of said brim to engender frangibility of said brim.

* * * * *